(No Model.)
W. J. EDWARDS.
VELOCIPEDE SADDLE.
No. 448,739. Patented Mar. 24, 1891.
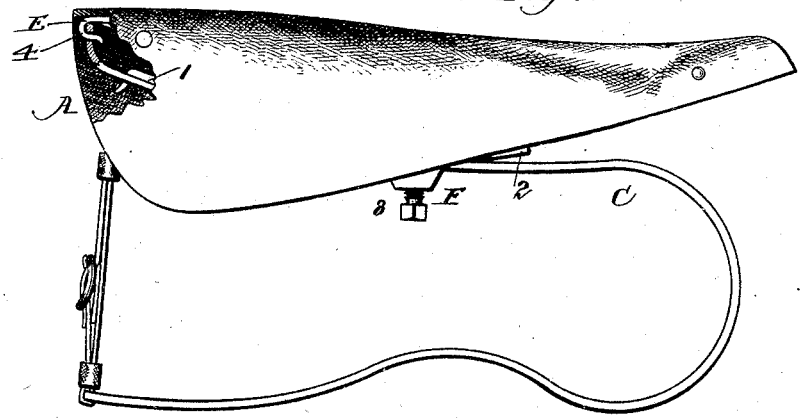
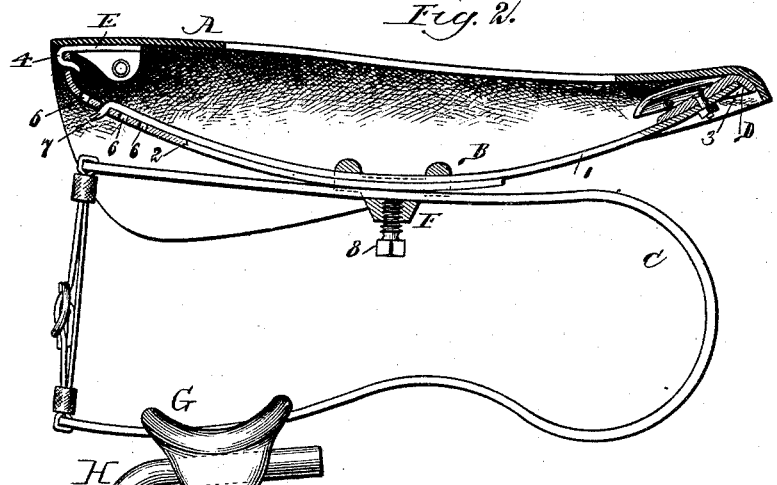
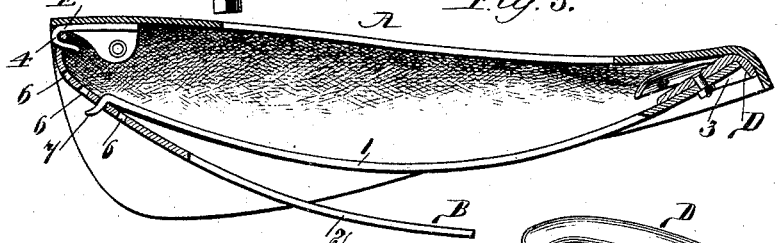
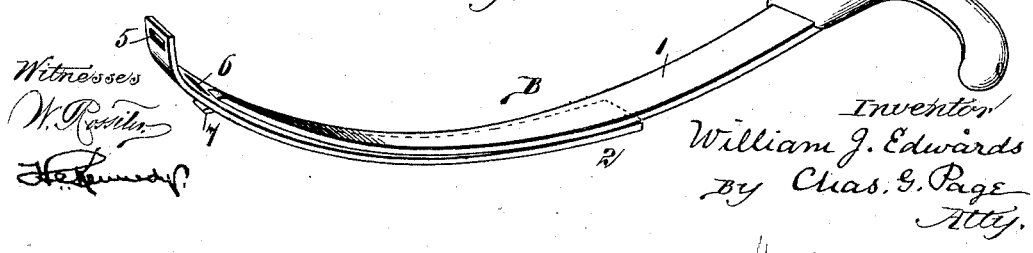
Witnesses
W. Rossiter
H. Kennedy
Inventor
William J. Edwards
By Chas. G. Page
Atty.

UNITED STATES PATENT OFFICE.

WILLIAM J. EDWARDS, OF CHICAGO, ILLINOIS.

VELOCIPEDE-SADDLE.

SPECIFICATION forming part of Letters Patent No. 448,739, dated March 24, 1891.

Application filed May 19, 1890. Serial No. 352,419. (No model.)

*To all whom it may concern:*

Be it known that I, WILLIAM J. EDWARDS, a citizen of the United States, residing at Chicago, in the county of Cook and State of Illinois, have invented certain new and useful Improvements in Velocipedes, of which the following is a specification.

My invention relates to seats for bicycles, tricycles, and similar machines coming under the head of velocipedes, and has for its principal object to provide improved and efficient means for adjusting the power of a stretching-spring employed to support and stretch the saddle; to provide an adjustable spring for the purpose aforesaid involving the features of strength, durability, and simplicity; to permit the adjustment of the spring to be readily made by the user of the machine, so that in case the saddle should sag by reason of continued use the fault can be easily remedied, and, further, to permit the adjustment of the spring as a whole so as to tilt the saddle or vary the distance between the point whereat the spring is held and the ends of the saddle.

In carrying out my invention I provide a two-part spring or a spring involving a couple of plates or leaves, which are arranged so that an end of one of said component members of the spring may extend forward and connect with the forward end portion of the saddle, while an end of the other one of said spring members may extend to the rear and connect with the rear end portion of the saddle. The said ends of the two spring-plates may respectively connect with the forward and rear ends of the saddle by any suitable hinge-connections; but as a special and preferred matter of improvement one of the spring-plates is hinge-connected with the saddle, while the other spring-plate is connected with the saddle by what may be considered as a rigid fastening. One spring-plate thus connected at what may be regarded as its outer end with the saddle has its inner end attached to the other spring-plate by an adjustable connection, whereby the length of the spring comprising the two plates can be varied by adjusting one plate upon the other.

To permit the ready adjustment of the spring for the purpose aforesaid, and to enable the operator not only to so adjust the spring but to apply with ease a degree of force sufficient for stretching the saddle to the desired extent, one of the spring-plates has at its inner end a shifting or adjustable hinge connection with the other spring-plate, so that one of the spring-plates can be used as a lever both for bringing the spring-plates together and for stretching the saddle, as will be more readily understood by reference to the accompanying drawings, in which—

Figure 1 represents, in side elevation, the saddle and a spring-support therefor, with a portion of the saddle broken away. Fig. 2 shows the saddle and spring-support, partly in elevation and partly in vertical section on a plane coincident with the longitudinal middle line of the saddle. Fig. 3 represents a section on a vertical plane through and coincident with the longitudinal middle line of the saddle, and shows the stretching-spring partly in section, with one of its spring-plates swung away from the other, for a purpose hereinafter explained; and Fig. 4 shows the adjustable stretching-spring in perspective.

In said drawings, A indicates the saddle, B the stretching-spring, and C a seat-spring whereon the stretching-spring is preferably supported.

The stretching-spring comprises a couple of spring-plates 1 and 2, which, when held together, constitute spring-leaves in a semi-elliptic or proximately semi-elliptic spring. The spring-plate 1 is preferably connected with the saddle by a rigid attachment, and to such end it can be clipped or riveted or otherwise secured to an end support D, whereon an end portion of the saddle is held. The spring-plate 1 could, however, be hinged to said end support; but I do not regard such mode of connection as necessary, and hence have herein shown as a preferred and simpler arrangement the outer end of the spring-plate 1 fitted and secured within a recess 3 in the end support D. The spring-plate 2 is at its outer end hinge-connected with the saddle, and as an exceedingly simple way of providing such hinge connection, the end plate or support E at one end of the saddle may have a hook 4, which engages in an opening 5 in the upturned outer end of the spring-plate 2, thereby providing a hook-and-eye connection between the spring-plate or leaf and the saddle. As a matter of course, other forms of hinge joints involving, for example, the use of pintles, could be employed, although the form of hinge connection herein shown is both simple and economical.

The spring-plate 2 is provided with a series of openings 6, and the spring-plate 1 has its inner end bent to provide a hook 7, which may engage in any one of said openings 6 in the spring-plate 2. By such arrangement the two spring-plates are adjustably connected together, so that the length of the spring comprising said members can be shortened or lengthened, it being seen that the length of the spring as a whole will be dependent upon the point at which the inner end of one spring-plate is connected with the other spring-plate, and that the saddle will be stretched between its ends and its tension regulated proportionally to the length of the stretching-spring.

The two spring-plates can be held together along the opposing portions of their length by a clip or holder F, which may in turn be adjustably held upon the upper arm of the seat-spring C.

In order to change the point of connection between the two spring-plates so as to vary the length of the stretching-spring, the clip F, which embraces the two spring-plates, can be slipped along the same, or the saddle as a whole can be shifted so as to move the spring through the clip to an extent to free the spring-plate 2 from the clip. The spring-plate 2 can then be swung down, as illustrated in Fig. 3, and the hook on spring-plate 1 can be shifted from one to another of the holes in the spring-plate 2, in accordance with the extent of adjustment it is desired the stretching-spring shall have. After the hook of one spring-plate has been placed in engagement in one of the holes of the other plate, as in said Fig. 3, the plate 2 can be brought against the plate 1, so as to form a completed stretching-spring, as in Fig. 2, and in thus bringing the two spring-plates together the spring-plate 2 can be operated as a lever for stretching the saddle in correspondence with the increased length of its stretching-spring. When thus operating the spring-plate as a lever for the purpose of bringing the spring-plates together and stretching the saddle, the two spring-plates will in effect operate as a compound lever, in which way the resistance to the bringing of the spring-plates together can be readily overcome by the operator. By practically operating the spring-plate 2 in the manner aforesaid it will be found that the farther the point of connection between the inner end of spring-plate 1 and the spring-plate 2 is made from the hinge-support for the outer end of spring-plate 2 the greater will be the power required to overcome the resistance opposed to the bringing of the two springs together, and hence that the features of compound leverage involved are of material assistance to the operator.

The spring-plate 1 has not only an adjustable connection with the spring-plate 2, but also an adjustable hinge connection with the same, in which way while the features of adjustability involved permit the adjustment in length of the stretching-spring as a whole, the feature of hinging the plate 1 to the plate 2 allows the plates to be first separated in order to permit an adjustment of the distance between the two points at which the stretching-spring connects with the saddle, and then brought together so as to stretch the saddle. When the spring-plate 2 is swung away from the spring-plate 1, as in Fig. 3, the saddle will, so to speak, be loosened or slackened up, but when the two plates are brought together the saddle will be stretched.

In place of forming a hinge connection between the two plates by means of a hook on one plate and holes in the other plate, I can obviously provide other forms of hinge connections adapted to subserve the purposes of the hook and holes—as, for instance, one plate could be connected with the other by an adjustable shackle or hinged clip. It will also be seen that I may, for example, adjustably secure the outer end of plate 1 to the end plate or support D, and that when the saddle and the saddle-frame involving the stretching-spring B is, so to speak, loosened up, as in Fig. 3, the adjustment of spring-plate 1 on its end support D can be readily effected, and that after such adjustment has been so made the whole can be tightened up by bringing the two spring-plates together, as in Fig. 2.

The clip F can be adapted for clamping and loosening the two members of the stretching-spring in various obvious ways; but when I support the stretching-spring B on the upper arm of the seat-spring C (as I prefer to do) said spring-arm, together with the two spring-plates 1 and 2, can be extended through the clip, as in Fig. 2, in which way the set-screw 8, allotted to the clip, will, when tightened against the upper arm of the seat-spring, cause said spring-arm and the two spring-plates to be firmly held together within the clip. By loosening the set-screw the clip can be adjusted along the upper arm of the seat-spring, and when so desired the stretching-spring can be as a whole adjusted through the clip, so as either to support the seat-spring at a point nearer toward one end of the saddle or to set the saddle in an inclined position.

While the adjustable spring B may, as hereinbefore set forth, be held upon any suitable or desired support, I prefer to hold it by a clip upon the upper arm of a spring C, and when so applied I prefer to adjustably hold the lower arm of spring C by a clip G, which is adjustably and removably held upon the upper portion of the seat-standard H, as in my application for Letters Patent of the United States, filed on or about the 14th day of December, 1889, and serially numbered 333,814. With this arrangement the seat-spring C can be detached from clip G, and the stretching-spring B can be detached from clip F and transferred to clip G, thereby providing a low-down seat.

It will be obvious that by first slipping the stretching-spring through clip F, so as to free the part or leaf 2 from said clip, the two leaves of the spring can be separated, as in Fig. 3, and that thereupon the leaf 1 of the spring can be entirely disconnected from leaf 2, so as to permit leaf 1 to be withdrawn from the clip. By a reversal of the foregoing operation the stretching-spring can be applied to clip G after the spring C has been withdrawn from said clip.

What I claim as my invention is—

1. A stretching-spring for a velocipede-seat, comprising a couple of leaves attached to one another and respectively to the opposite ends of the saddle, said leaves overlapping each other for a portion of their length, and a clip for holding said overlapping portions together.

2. A stretching-spring for a velocipede-saddle, comprising a couple of leaves adjustably attached to one another and respectively connected with opposite ends of the saddle, so as to stretch the same proportionally to the adjustment of one leaf upon the other, and a clip embracing said two leaves and adjustable thereon.

3. A stretching-spring for a velocipede-saddle, comprising a couple of leaves adjustably attached to one another and respectively connected with the opposite ends of the saddle, said leaves overlapping each other for a portion of their length, and a clip for holding said overlapping portions together, the connection between one of said leaves and the saddle being a hinge connection, for the purpose set forth.

4. A stretching-spring for a velocipede-saddle, comprising a couple of leaves respectively connected with opposite ends of the saddle, said leaves being attached to one another by a hinge connection, and one of them being connected with the saddle by a hinge connection, for the purpose set forth.

5. A stretching-spring for a velocipede-saddle, comprising a couple of leaves respectively connected with opposite ends of the saddle, said leaves being attached to one another by an adjustable hinged connection, and one of them being connected with the saddle by a hinge connection, for the purpose set forth.

6. The combination, substantially as hereinbefore set forth, with the saddle, of the stretching-spring comprising a leaf 2, hinged to the saddle and provided with a set of apertures 6, and a leaf 1, attached to the saddle and provided with a hook 7 for engaging in any of said perforations.

7. The combination, with the saddle, of the stretching-spring B, applied thereto and comprising leaves 1 and 2, the leaf 2 being hinged to the saddle by a hook-and-eye connection, and the leaf 1 being hinged to the leaf 2 by a similar connection, for the purpose set forth.

8. The combination of the saddle, the adjustable stretching-spring comprising a couple of leaves respectively connected with opposite ends of the saddle and adjustably attached to one another, the seat-spring C, and a clip embracing the upper arm of the seat-spring and the two leaves of the stretching-spring, substantially as and for the purpose set forth.

9. The herein-described arrangement of the seat-spring C, adjustably and removably applied to a holder, and the saddle provided with a two-part adjustable stretching-spring B, which is removably held upon said seat-spring, whereby the stretching-spring can be transferred from its support on the seat-spring to the support for the latter after the seat-spring has been removed from its allotted holder, for the purpose set forth.

WILLIAM J. EDWARDS.

Witnesses:
 HARRY C. KENNEDY,
 CHAS. G. PAGE.